H. J. MANSELL AND C. D. FRY.
CHANGE SPEED GEAR MECHANISM.
APPLICATION FILED AUG. 12, 1920. RENEWED MAR. 9, 1922.
1,421,799.
Patented July 4, 1922.
2 SHEETS—SHEET 1.
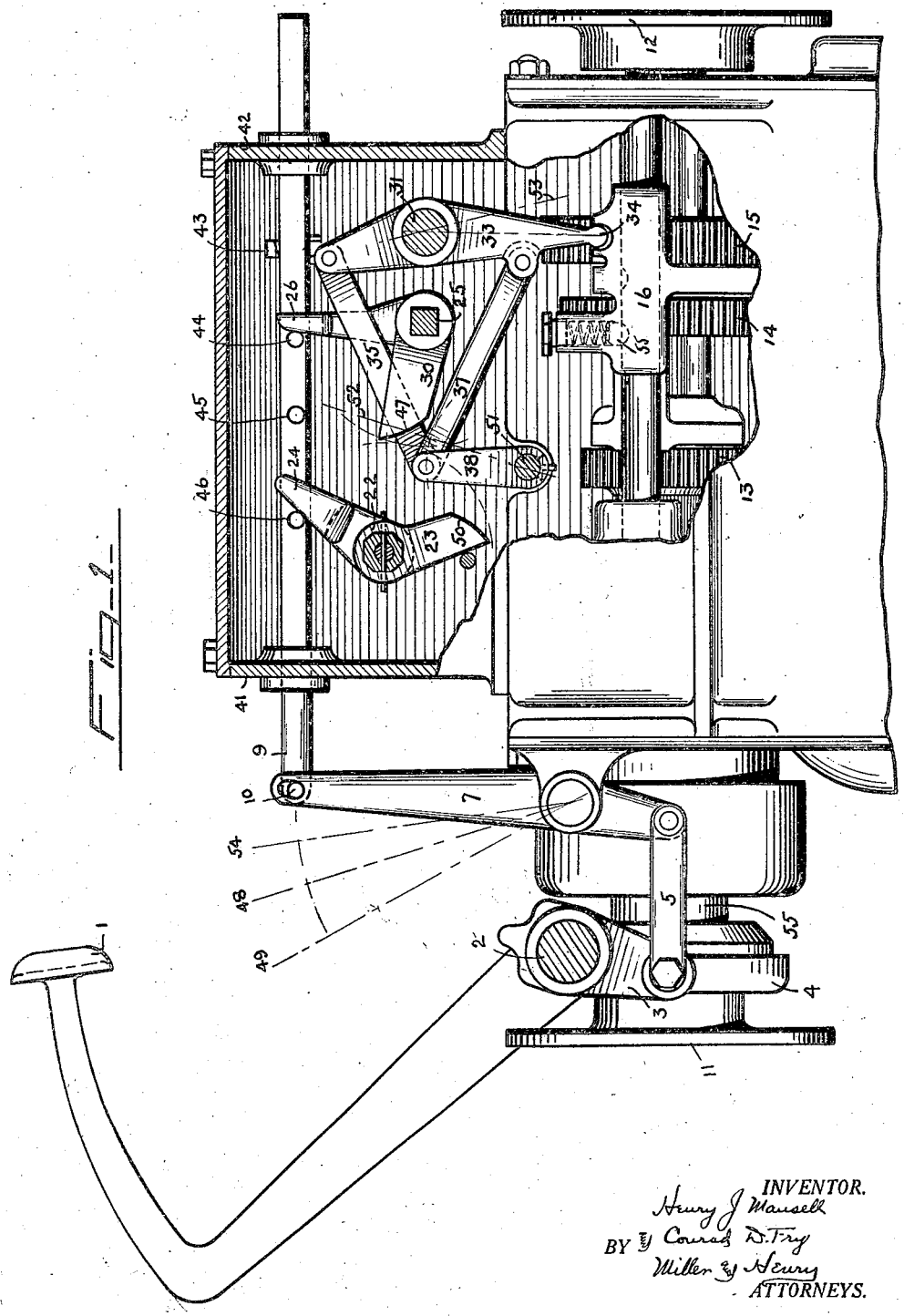

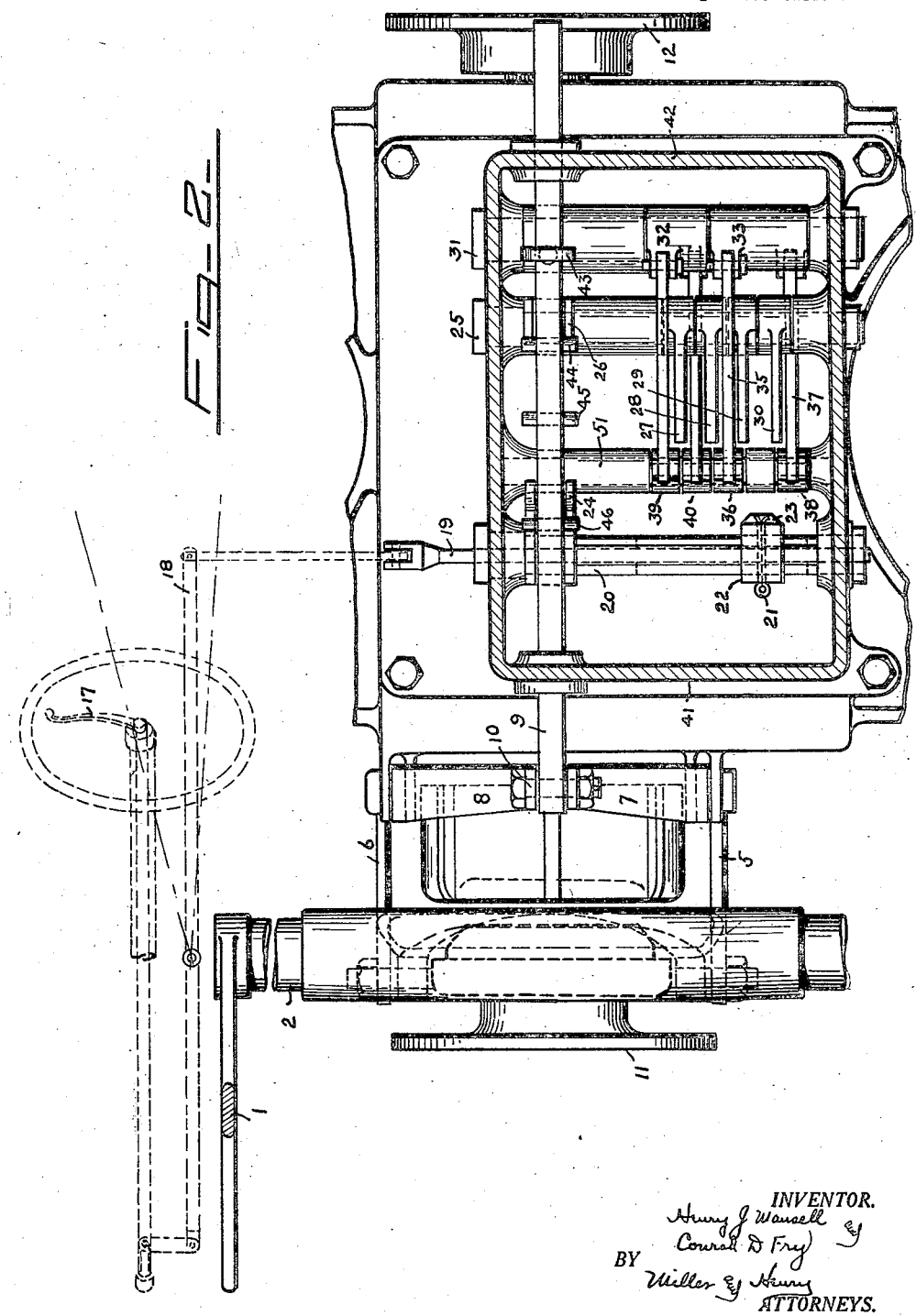

UNITED STATES PATENT OFFICE.

HENRY J. MANSELL, OF OAKLAND, AND CONRAD D. FRY, OF ALAMEDA, CALIFORNIA.

CHANGE-SPEED-GEAR MECHANISM.

1,421,799.  Specification of Letters Patent.  Patented July 4, 1922.

Application filed August 12, 1920, Serial No. 403,164. Renewed March 9, 1922. Serial No. 542,481.

*To all whom it may concern:*

Be it known that we, HENRY J. MANSELL and CONRAD D. FRY, a subject of Great Britain and a citizen of the United States, respectively, and residents of Oakland and of Alameda, respectively, and both of the county of Alameda and State of California, have invented new and useful Improvements in Change-Speed-Gear Mechanisms, of which the following is a specification.

Our invention relates to improvements in the means and method of shifting gears in the gear drive of motor propelled vehicles, and is particularly adapted to automobiles, and whereby we obviate the inconvenience of the present method of gear shifting, wherein the clutch is first disengaged and the gear then shifted during clutch disengagement, and the mechanism then reclutched. This we accomplish by introducing mechanism whereby the gear through which the machine is to be reconnected, is selected at any period in advance of the declutching operation, and thereafter the act of declutching and reclutching disengages the previously operating gear and introduces the new gear combination without any other operation; thus securing simplicity, quicker and more effective gear-shifting, and accomplishing the gear change more safely than heretofore, in that the operator with a single foot movement produces the desired gear shifting, leaving his hands available for other operations and entirely disassociated with gear shifting and clutching operations. These objects we attain by displacing certain of the actuating elements in relation to any selected one of a series of gear changes and also neutral and reverse, and thereafter operating the clutch mechanism which coincidentally disconnects the gear previously in engagement and immediately follows by engaging the newly selected gear, or if no gear has been selected engaging the clutch in neutral. Other objects will appear from the specification and drawings which follow.

Fig. 1 is a side elevation partly in view and partly in section, of our invention as applied to a standard form of automobile, the other parts of the automobile being left out but are well known.

Fig. 2 is a plan view of Fig. 1 with the cover and the gears removed to illustrate the arrangement of the parts, and showing diagrammatically one way by which the selecting operation is accomplished from the operator's seat.

Throughout the figures similar numerals refer to identical parts.

The foot pedal adapted to operate the clutch of a well known automobile is shown by the numeral 1 mounted upon the shaft 2, which carries the forked lever 3 and clutch disc 4, adapted to clutch the engine driven flange 11 with the gear drive shaft 55 in the well known way. The lever 3 carries also a pair of links 5—6 actuating the lever 7—8, which is adapted to operate the rod 9 through a bolt and slot connection 10. At 11 is shown a flange connected to the engine drive and at 12 the flange by which the driving energy is transmitted to the rear construction, the remaining parts of the motor vehicle being well known and not shown. The trains of gears are indicated as at 13, 14 and 15, whereby the rate of revolutions of the engine 11 may be varied with relation to the drive shaft from 12 by the shifting of the selector block 16 and idler gear carried thereby, whereby different gear ratios are introduced between the driving end 11 and the driven end 12. Such gear mechanism to vary the relative speeds between 11 and 12 is well known, and in modern automobile practice the shifter block or blocks as 16 are shifted by positive connections from the driver's seat while the engine is declutched and upon reclutching by the clutch 4 on the release of the pedal 1 the newly selected gear establishes a new speed ratio between 11 and 12.

In mechanisms of our invention the block 16 is not shifted by direct operation from the driver's seat but is operated automatically as will be described below, and during the period of declutching and after a selection of the new speed desired has been made by the operator.

Referring to Fig. 2, the selection is made by the operator as by manual movement of any suitable device, which is indicated in the drawing by the rotation of the hand lever 17 which shifts the lever 18 causing an in-and-out movement of the selector rod 19. This rod passes through a shaft 20 which is shown in the drawing as octagonal, pinned or otherwise secured to the rod 19 by the pin 21 in the sliding block 22. On the underside of this block 22 is formed the lever 23 having a cam shaped end 50, see Fig. 1, and carried on the shaft 20 is the forked lever 24. It will thus be seen that by the movement of the forked lever 24 the shaft 20 may be rotated and the cam shaped lever 23 (in any position that may have been selected by the rod 19) will be caused to swing through an arc.

At 25 is shown a shaft upon which is mounted the forked lever 26 and the cam ended levers 27, 28, 29, and 30. It will be noted that between 29 and 30 a greater space is left, and this space corresponds with the neutral position of the selector block and lever 22, 23 as will be described below.

It is to be noted that the movement of the forked shaped lever 26 causes a corresponding movement about the shaft center 25 of the cam levers 27, 28, 29 and 30.

At 31 we have shown a shaft upon which the rocking levers 32 and 33 may rotate in either direction, and upon the end of each of these rocking levers is mounted a ball joint 34, which is in engagement with the selector block 16, it being understood that rocking lever 32 has a similar extension and connection with another selecting block not shown, but employed to make other gear ratio selections. The rocking lever 33 is connected by link 35 with a lever 36, and on the opposite side the axis 31 by the link 37 with the lever 38. Similar connections are made from the rocking lever 32 to the levers 39 and 40. The levers 36, 38, 39 and 40 are mounted upon a separate shaft 51 and have their ends formed to be acted upon by the cam 50 of lever 23 whenever its selected position is opposite to one or the other of the said levers and on the opposite side to be acted on by the levers on the shaft 25. The rod 9 which extends through the gear housing 41—42 from end to end, carries fixed thereon the cross head 43 pins 44, 45 and 46, which cross head and pins are adapted to operate the forked levers 26 and 24 to produce the selecting and shifting movements.

It will be observed that a movement about the axis 25 of the lever 30 in a downward direction will cause the cam face 47 to act against the end of the lever 38 if it has been displaced from the vertical position of Fig. 1 to the dotted position 52, bringing the said lever 38 back into its vertical position. In the same way the cam lever 29 returns the lever 36 to its vertical position and levers 28 and 27 are correspondingly actuated to bring back into vertical position the levers 40 and 39 respectively. If the levers 36, 38, 39 and 40 have been displaced from their vertical position in Fig. 1, due to any of the gears being in engagement, a movement of the forked lever 26 to the left, causing the rotation of the shaft 25, will immediately cause the disengagement of the said gear. It will also be observed that movement of the lever 24 to the left will cause the block 22 and the cam face lever 23 to operate in a direction to throw any one of the levers 36, 38, 39 and 40 to the right and into the dotted line position 52 unless the selector block be in the neutral position shown in Fig. 2, in which case no one of the aforesaid levers or gears will be engaged. The rotation of the engine 11 will not be communicated through the flange connection 12 to the operating mechanism of the vehicle under the aforesaid condition.

If, however, due to the movement of the lever 2, the lever 23 is rotated about the shaft 20 in line with any of the levers 36, 38, 39 and 40, it will cause an engagement of one or the other of the gears, and the rotation of the engine shaft and connection 11 will be communicated to the flange connection 12 at a corresponding gear ratio either direct ahead or reverse, depending on the gear connections as 13, 14 and 15. This result follows due to the shifting that will have been caused by one of the shifting blocks as 16 in Fig. 1, actuated from the double lever 33 as by the link connection 37 from the lever 38 in the well known way.

The operation is as follows:

The operator selects the particular gear speed that he desires by a corresponding setting of the hand lever or other similar device, as indicated at 17, Fig. 2, the movement of which will have caused the shifting of the cam faced lever 23 to that selected position opposite one of the gear speed or neutral or reverse levers. This may be done at any time and during engine operation. Thereafter the depressing of the clutch pedal 1 causes the shifting of the gears as follows: the pedal 1 causes the rocking of the shaft 2 and a corresponding movement of the lever 3, links 5, forked lever 7, and the lateral movement of the rod 9 in the left hand direction, see Fig. 1. The first movement by the foot pedal 1 will cause the declutching at the clutch 4 in the well known way and before the cross member 43 contacts with the extended end of the lever 26, so that the engine may be declutched without disturbance of the gear setting. A further depression of the clutch pedal 1 causes a further movement of the rod 9 and engages the cross member 43 with the lever 26 causing the depressing of the cam face 47 of the lever 30, and the forcing of the lever 38 in a left hand direction, thus throwing the gear out of engagement and disconnecting the operation of the engine through the flange 11 from the operation of the shaft 12, so that the mechanism is now in neutral regardless of the position of the selector block 22 and its lever 23. This movement of the lever 26 towards the left will continue until its end slides under the end of the cross member 43. The lever 7 will at this time be in substantially the dotted position indicated at 48. A further depression of the clutch pedal produces a further movement of the rod 9 corresponding with the dotted position 49 of lever 7, at which time the pin 45 will have engaged the lever 24 and caused it to swing to the left, raising the selector lever 23 and causing the cam face 50 thereof to force any one of the selected levers 39, 40, 36, 38 to the right; unless the block be in the neutral position indicated in Fig. 2, in which case it will swing freely without causing any movement of the levers on the shaft 51. Assuming that the selector has been placed to actuate lever 38, this lever will now be rotated into the dotted line position 52, and through the action of the link 37, the double lever 33 will have been moved into the dotted position 53, carrying with it the shift block 16 and its associated gears to cause the reverse movement of the shaft connection 11. The foot pedal 1 is now released and the action that takes place is as follows: The lever 24 is forced back into its original position by the pin 46 and the lever 26 is forced back into its original position by the pin 44, the clutch 4 is again engaged and the vehicle drives from 11 through the gears to 12 in a reverse direction.

To throw the gears into neutral it is only necessary to depress the pedal 1 to shift lever 7 into dotted position 48 or to place the lever 17 in the neutral position and thereafter to depress the foot pedal 1. To change the gear to low speed driving, it is only necessary to move the selector block by the operating lever 17 into a position opposite lever 36 and to depress the foot pedal from the position shown in Fig. 1, until it has shifted the lever 7 to the dotted line position 49, when the action will have been first, the declutching of 4, next the throwing out of the reversed gear by returning the lever 38 on the line 52 to its full line position, when the block 16 will have been shifted into the neutral position, and thereafter the cam face 50 of the lever 23 will be raised against the lever 36, causing the link 35 to shift the block 16 towards the left, establishing a direct drive at low speed from 11 to 12 through the gear train in the well known way. The foot pedal is now released and the automobile will drive forward at low speed.

To shift the gears into intermediate, the setting of the lever 17 is first made to shift the lever 22 opposite the lever 40 and thereafter at any convenient time to depress the foot pedal to the limit when the lever 36 will be returned to its vertical position, and thereafter the lever 23 will, through the action of its cam face 50 on the lever 40, cause the engagement of the intermediate speed gear between 11 and 12. A further movement of the operator's lever 17 into the full speed forward position will set the selector block 22 opposite the lever 39 and thereafter depression of the foot pedal until lever 7 occupies the dotted position 49, will cause the shifting of the speed gears in the same manner as before, that is, releasing the gear operated by the lever 40 from engagement and engaging the high speed gear through the action of the lever 39 against the cam face 50, causing the rocking of the lever 32 and the movement of the other shift block corresponding with 16 but not shown, and engaging with the rocking lever 32 in the same manner as the previous movements described of the block 16 caused from the levers 36—38.

It is to be understood that ball latches or other well known devices may be employed to hold the several parts at their shifted position as at 55, such devices are well known, and our invention is also applicable to other forms of gear drive and we wish to be understood as claiming all such.

We claim:

1. In gear shifting mechanism a plurality of gears constructed and adapted to be engaged in any of a plurality of combinations, a lever and connections for each combination, a plurality of cams adapted to actuate said levers to disengage any existing gear combination, a selector movable opposite to any of said levers and adapted when operated in said position to cause the movement of the corresponding lever to establish a gear combination, and a pedal and connections actuating the said cams and thereafter operating the selector to shift one of the levers depending upon its selected position.

2. Apparatus as set forth in claim 1 and means operable from a remote point to slide said selector into any selected position.

3. Apparatus as set forth in claim 1, wherein said connections comprise a slidable rod and trip means thereon to operate said cams and other trip means thereon to operate said selector.

4. In gear shifting mechanism a plurality of gears constructed and adapted to be engaged in any of a plurality of combinations, a lever and connections for each combination, a plurality of cams adapted to actuate said levers to disengage any existing gear combination, a selector movable opposite to any of said levers and adapted when operated in said position to cause the movement of the corresponding lever to establish a gear combination, and a pedal and connections actuating the said cams and thereafter operating the selector to shift one of the levers depending upon its selected position, in combination with a clutch and connections therefor to said pedal whereby the first pedal movement disengages said clutch.

5. Apparatus as set forth in claim 4 and means operable from a remote point to slide said selector into any selected position.

6. Apparatus as set forth in claim 4, said connections comprising a slidable rod and trip means thereon to operate said cams and other trip means thereon to operate said selector.

In testimony whereof, we have hereunto set our hands at San Francisco, State of California, this 30th day of July, 1920.

HENRY J. MANSELL.
CONRAD D. FRY.